US008049643B2

(12) United States Patent
Ness

(10) Patent No.: US 8,049,643 B2
(45) Date of Patent: Nov. 1, 2011

(54) VEHICLE TRACKING SYSTEM FOR VEHICLE WASHING

(76) Inventor: Pete Ness, Boise, ID (US)

( * ) Notice: Subject to any disclaimer, the term of this patent is extended or adjusted under 35 U.S.C. 154(b) by 513 days.

(21) Appl. No.: 12/365,375

(22) Filed: Feb. 4, 2009

(65) Prior Publication Data

US 2010/0194597 A1 Aug. 5, 2010

(51) Int. Cl.

| | |
|---|---|
| ***G08G 1/017*** | (2006.01) |
| ***A47L 5/00*** | (2006.01) |
| ***B08B 3/00*** | (2006.01) |
| *G05B 11/01* | (2006.01) |

(52) U.S. Cl. ..................... 340/937; 340/425.5; 340/673; 134/123; 700/11; 700/17; 700/83; 15/97.3; 15/306.1; 701/1; 382/103

(58) Field of Classification Search ................... 340/937
See application file for complete search history.

(56) References Cited

U.S. PATENT DOCUMENTS

| | | | |
|---|---|---|---|
| 3,296,615 | A | 1/1967 | Page et al. |
| 4,339,753 | A | 7/1982 | Mawhinney |
| 4,385,322 | A | 5/1983 | Hubach et al. |
| 4,611,347 | A | 9/1986 | Netravali et al. |
| 4,851,849 | A | 7/1989 | Albersdoerfer |
| 4,893,229 | A | 1/1990 | Detrick |
| 5,031,228 | A | 7/1991 | Lu |
| 5,554,983 | A | 9/1996 | Kitamura et al. |
| 6,590,521 | B1 | 7/2003 | Saka et al. |

*Primary Examiner* — Donnie Crosland
(74) *Attorney, Agent, or Firm* — Frank J. Dykas; Dykas & Shaver LLP

(57) ABSTRACT

The invention is directed towards an automated system for tracking a vehicle, associating that vehicle with a vehicle washing selection, and tracking the vehicle until it enters the vehicle washing station for subsequent presentation of the vehicle washing selection to the control computer of the vehicle washing system for subsequent washing.

18 Claims, 3 Drawing Sheets

VEHICLE TRACKING SYSTEM FOR VEHICLE WASHING

FIELD OF THE INVENTION

The invention generally relates to an apparatus for tracking vehicles at a vehicle wash and more particularly to tracking vehicles at a vehicle wash, identifying their vehicle washing selections, and tracking the vehicle and the vehicle washing selection until the vehicle is washed.

BACKGROUND OF THE INVENTION

The present invention is directed to a vehicle tracking system for an automated vehicle washing system.

Automatic vehicle washes are well known and very popular. One goal of these vehicle washing systems is to wash as many vehicles as possible while providing an automated system so a customer does not have to wash a vehicle by hand. Some vehicle washing service stations provide one washing selection input station and subsequently the customer drives the vehicle forward to the vehicle washing system. In this system, vehicles enter one at a time into the washing system and the vehicles maintain approximately a single file line. Other vehicle washes have multiple pay points with multiple vehicle washing selection services available. After the customers enter their selections and pay for the selections at one of the multiple pay point systems, the vehicles typically exit the selection and pay area and enter a queue point area where they wait for entry into a washing tunnel.

When a customer purchases a vehicle washing service, a problem can arise if the vehicle washing equipment system does not receive the proper service selection that the customer ordered. A current solution to this problem, as generally know in the art, is to allow for one vehicle to pull forward from the pay point to a single file queue point. Once the vehicle reaches the single file point, another vehicle can be released from the pay area gate. In this way the system can provide the correct wash to the correct vehicle as opposed to confusing the identification of the vehicles and their respective washing selections.

Another problem associated with both of these vehicle washing systems is that there is a relatively high risk of not having a vehicle to wash when there is an open spot in the tunnel for a vehicle. This could happen if a vehicle does not immediately exit the vehicle washing selection input area and travel directly to the line for the vehicle washing tunnels. Accordingly, if the vehicles do not enter the line directly following their service selection, the timing of the service selection arriving at the vehicle washing station and the vehicle arriving at the vehicle washing station may be off. Consequently, the vehicle may receive the incorrect wash.

Additionally, it is important for efficiency purposes to have a vehicle in the tunnel at all times if there is a large buildup at the entry gate. If there is not a vehicle in the tunnel at all times, the overall efficiency of the vehicle washing system is decreased and the system can lose potential revenue. Furthermore, if a customer runs into a problem, for example, if the customer is putting a wallet away, waiting for a receipt to print, or any number of other things that could happen at the pay point, on a busy day efficiency is decreased as a whole as the vehicle is holding up the line and preventing a smooth flow of vehicles to the vehicle washing tunnel. In some high volume vehicle washes, efficiency is particularly important in that a small amount of time savings can lead to more vehicles entering the washing system. For example, some vehicle washes have vehicles enter at as high of a rate as one vehicle every approximately fifteen seconds. A decrease in the amount of time between vehicles can lead to a vehicle washing system with a likely increased efficiency and an increase in profitability.

In order to solve this problem, some vehicle washing system designs have a multiple gate and pay area solution in which there are multiple pay stalls for multiple vehicles to pay for vehicle washes. After making a vehicle wash selection and paying for the selection, the vehicles move through a gate towards the vehicle wash equipment and tunnel. The problem associated with this is determining to which vehicle a customer's vehicle washing service selection is associated. Many vehicle washing system designs have attempted to solve this by using people to input the vehicle selection service as the vehicle reaches the vehicle washing tunnel. Additionally, the vehicle washes will somehow mark a vehicle and then an operator in the tunnel entrance manually enters the vehicle number, picks a service, or uses some other mechanism to tell the tunnel which service or services to provide. The problem with this situation is that it uses a person, as an employee, to perform the task and thus increases the likelihood of error, fraud, or failure to provide the correct services each customer paid for.

Another potential difficulty with these vehicle washing systems is that multiple people are attempting to get into a vehicle washing tunnel that has only one access point. This can lead to multiple vehicle bottlenecks that can frustrate customers when they cannot immediately get into the vehicle wash. In turn, this can lead to decreased customer retention rates as customers may choose to go to a different vehicle wash if they become frustrated with the current system.

Accordingly, it is an object of the present invention to provide a system in which vehicles can enter a vehicle wash in any order and do not have to comply with a specific sequence, thus increasing efficiency.

Accordingly, another object of the invention is to provide a system that is fully automated to prevent human error and increase efficiency.

A further object of the invention is to provide a vehicle tracking system that automatically pairs the vehicle with the vehicle washing selection choice in order to increase the number of vehicles that can be washed in a given amount of time by decreasing the number of vacant vehicle washing tunnels and vehicles waiting in line.

A further object of the invention is to provide a vehicle washing system in which multiple vehicles can be washed with maximum system efficiency by minimizing the time a vehicle is not in the vehicle wash.

SUMMARY OF THE INVENTION

The present invention provides an automated vehicle wash system that tracks a vehicle, pairs the vehicle with the customer's vehicle washing selection, and subsequently allows for washing multiple vehicles at a time in a preferred embodiment. The invention provides for a vehicle washing system comprised of a vehicle tracking system coupled with a service selection input system, an interface between the two, and an interface with a central computer of a vehicle washing system. Accordingly, this system allows for multiple vehicle washing selections to be entered into the vehicle service selection input stations and allows multiple vehicles to enter the vehicle washing system in any order and still obtain the correct vehicle washing service.

Tracking systems are known in the art including, but not limited to, U.S. Pat. No. 5,031,228, U.S. Pat. No. 5,554,983, U.S. Pat. No. 4,851,849, U.S. Pat. No. 4,611,347, and U.S.

Pat. No. 4,385,322. Furthermore, service selection input stations are also known. One of the benefits of the current system is that it combines image tracking, a service selection input station, and a vehicle washing component for increased vehicle washing efficiency while decreasing the potential for human error by minimizing the interaction between employees and the system.

When a vehicle pulls up to the vehicle washing system, the driver of the vehicle encounters a plurality of service selection input stations in which the driver can input a selection for a vehicle wash. After this occurs, the vehicle tracking system tracks the vehicle and associates the vehicle washing selection with the vehicle. Subsequently, the vehicles generally move to a queue where multiple vehicles from multiple selection input stations wait for an opening in the vehicle washing system. When a vehicle reaches a point where the vehicle can enter the vehicle washing tunnel without another vehicle entering in front of it, the vehicle washing selection is transferred to the control computer of the system for vehicle washing.

The vehicle washing system itself is typically composed of a main control computer which controls the services of each of several vehicle washing tunnels. Although these tunnels are typically for vehicle washing they can also provide other vehicle services such as oil changes or other routine maintenance services. As vehicles wait for an open position in the vehicle washing tunnel's conveyor, the system tracks where each vehicle is located. Subsequently, as position becomes open in the tunnel and the vehicle moves toward the tunnel, the system tracks the vehicle and transfers the vehicle washing selection to the central computer of the vehicle wash system. The central computer then directs the vehicle washing selection to the vehicle washing tunnel equipment which then washes the vehicle. Additionally, the system can provide tunnels capable of servicing multiple vehicles at a time. In this manner after a vehicle has entered a first area of the tunnel where a service is performed on the vehicle and subsequently moved to a second area, an additional vehicle can enter the first area of the tunnel where the service can subsequently be provided to the vehicle. The central computerized vehicle wash controller systems can be similar to U.S. Pat. No. 4,893,229 to Detrick for a computerized vehicle wash controller system or any other automated vehicle washing system known in the art. After the vehicle is washed, the vehicle exits the tunnel and a new vehicle is allowed to enter the tunnel.

Additionally, an exit lane can be provided in the event that the customer has an emergency which occurs between the customer vehicle washing input station and the vehicle wash station, causing the customer and vehicle to leave the system. The exit lane can also have an image tracking system to track which vehicle is leaving in order to delete the vehicle tracking and its associated vehicle wash selection from the system.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
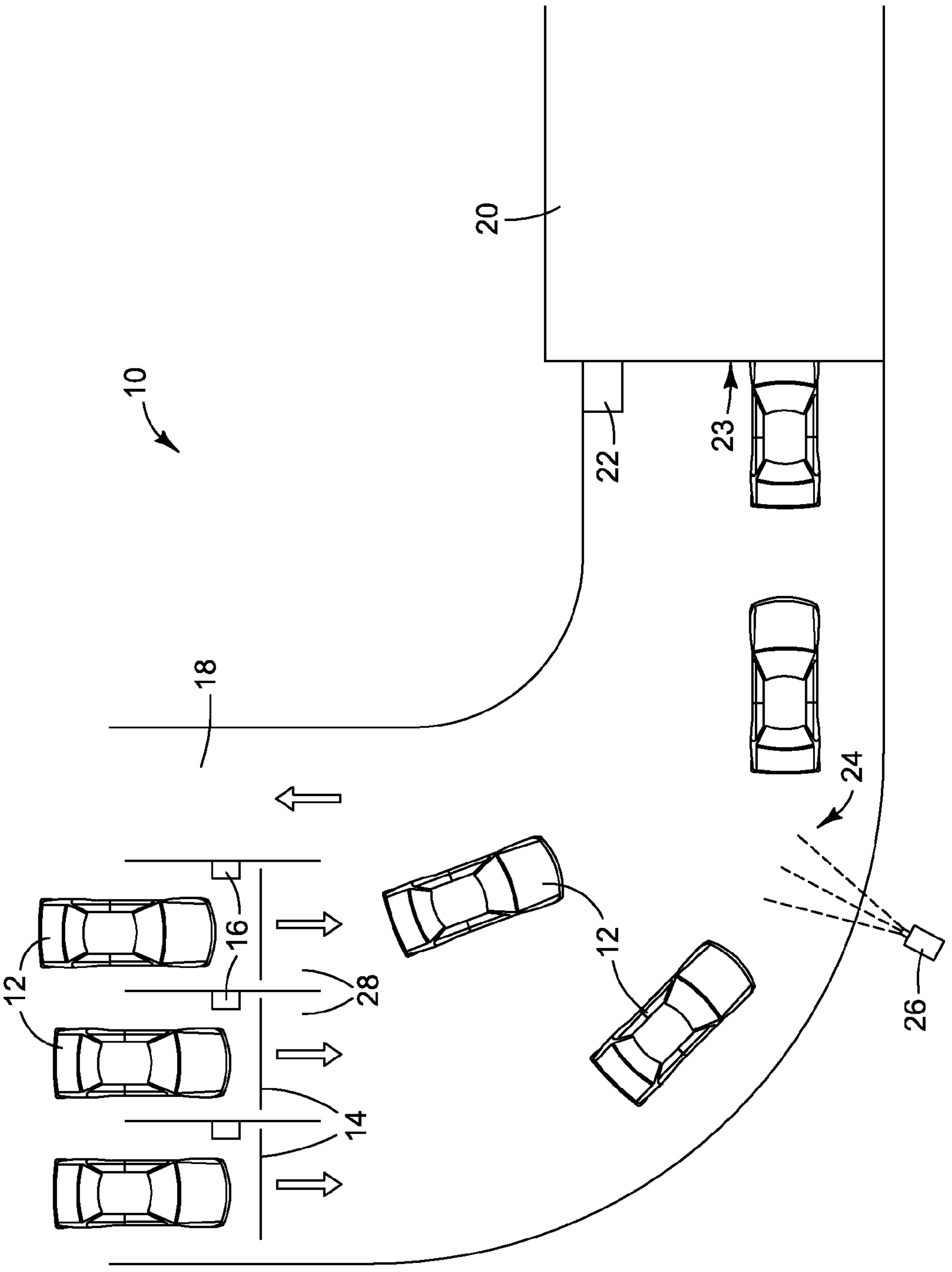
FIG. 1 is a view from above the vehicle washing system looking down on the system.

The invention is directed to a vehicle washing selection input station and tracking system interfaced with an automated vehicle wash system. The system allows for multiple vehicles to input a vehicle washing selection and subsequently move to a vehicle washing station for vehicle washing.

The invention provides for a multitude of input stations and associated gates wherein a customer inputs a vehicle washing selection and subsequently is allowed into the system when the gate associated with the input station opens. The system is configured to open the gate after the customer inputs a selection and pays for the selection. Generally, a customer can pay in a variety of ways including cash, check, coupon, credit card, or other payment means known. After the vehicle has crossed the gate, a video tracking system tracks the vehicle and associates the vehicle washing selection with the vehicle. In reference to the term inputtee in the claims, the term inputtee refers generally to a customer in a vehicle, a passenger in a vehicle, an employee of the vehicle washing station that takes the customer's selection and inputs it into the system, or any other operator or inputtee who can input a selection into the system.

In the event that there is only one vehicle washing tunnel associated with the vehicle washing system, the vehicles return to a single file queue point where the vehicles wait for an opening in the vehicle washing tunnel. After there is an opening in the vehicle washing tunnel, a vehicle enters the vehicle washing tunnel wherein the tracking system conveys the vehicle washing selection to a central computer, which directs the vehicle washing equipment to provide a vehicle washing service.

Alternatively, in the event that there are multiple vehicle washing tunnels associated with the system, the vehicles enter a queue point and proceed to an open tunnel when one becomes available. After a tunnel becomes available to enter, a vehicle travels towards the tunnel, the tracking system tracks the vehicle's location, and the vehicle tracking system transfers the vehicle washing selection to the vehicle washing control computer. Subsequently, the vehicle washing control computer directs the vehicle washing tunnel equipment to perform the desired vehicle washing task.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 illustrates an aerial view of the vehicle washing system wherein the vehicles 12 enter the system through entry lanes 28. Subsequently, vehicles are stopped by gates 14 at a vehicle washing selection input station 16. At this point, customers can enter their vehicle washing selection at the input station 16. The gates 14 open after the customer has selected a service and paid for the vehicle washing service. The vehicle 12 then crosses into the vehicle washing system at the gates 14. The gates 14 are in place in order to prevent a vehicle 12 from prematurely entering the system before entering a vehicle washing selection and paying for that selection. After the vehicles 12 cross the gates 14, the vehicle tracking system begins monitoring the vehicles 12 by determining and monitoring a plurality of points on the vehicle 12. In a preferred embodiment, these points are comprised of a plurality of points that comprise differences between the surrounding environment around the vehicle 12 and the vehicle 12 itself including, but not limited to, color changes, shape changes, and points of movement, etc. The system could also be configured to track points associated with the vehicle's passengers, to read barcodes on a printout of the vehicle washing selection, or any manner of tracking a vehicle as it moves through the vehicle washing station.

After the system has begun tracking the vehicle 12 and the vehicle washing selection is associated with the vehicle being tracked, the vehicle washing selection is delivered to the central control computer 22 of the vehicle washing system 20, the vehicles 12 subsequently move into the vehicle washing tunnel 23. The terminology vehicle washing tunnel or vehicle servicing tunnel generally refer to an area where a vehicle can be washed or serviced that is not specifically limited to an enclosed tunnel, but can also include an area that is not enclosed or not in the form of a tunnel as well as any other system for servicing or washing a vehicle in the art. The vehicle washing system 20 has a central control computer 22 located and configured such that the computer controls the vehicle washing tunnel or vehicle washing tunnels if there is more than one tunnel. Although in a preferred embodiment the vehicle washing system has one control computer 22 for controlling all of the equipment of the vehicle washing tunnels, the system can also have more than one computer for controlling the vehicle washing tunnels.

Additionally, an exit lane 18 is also provided in a preferred embodiment in the event a vehicle must unexpectedly exit the system. In a preferred embodiment, the tracking system is programmed with the location of the exit lane 18 and a vehicle tracking area located near the gate such that when the tracking points travel beyond the exit lane 18, the vehicle tracking and vehicle service selection can be purged from the system.

Figure 2:
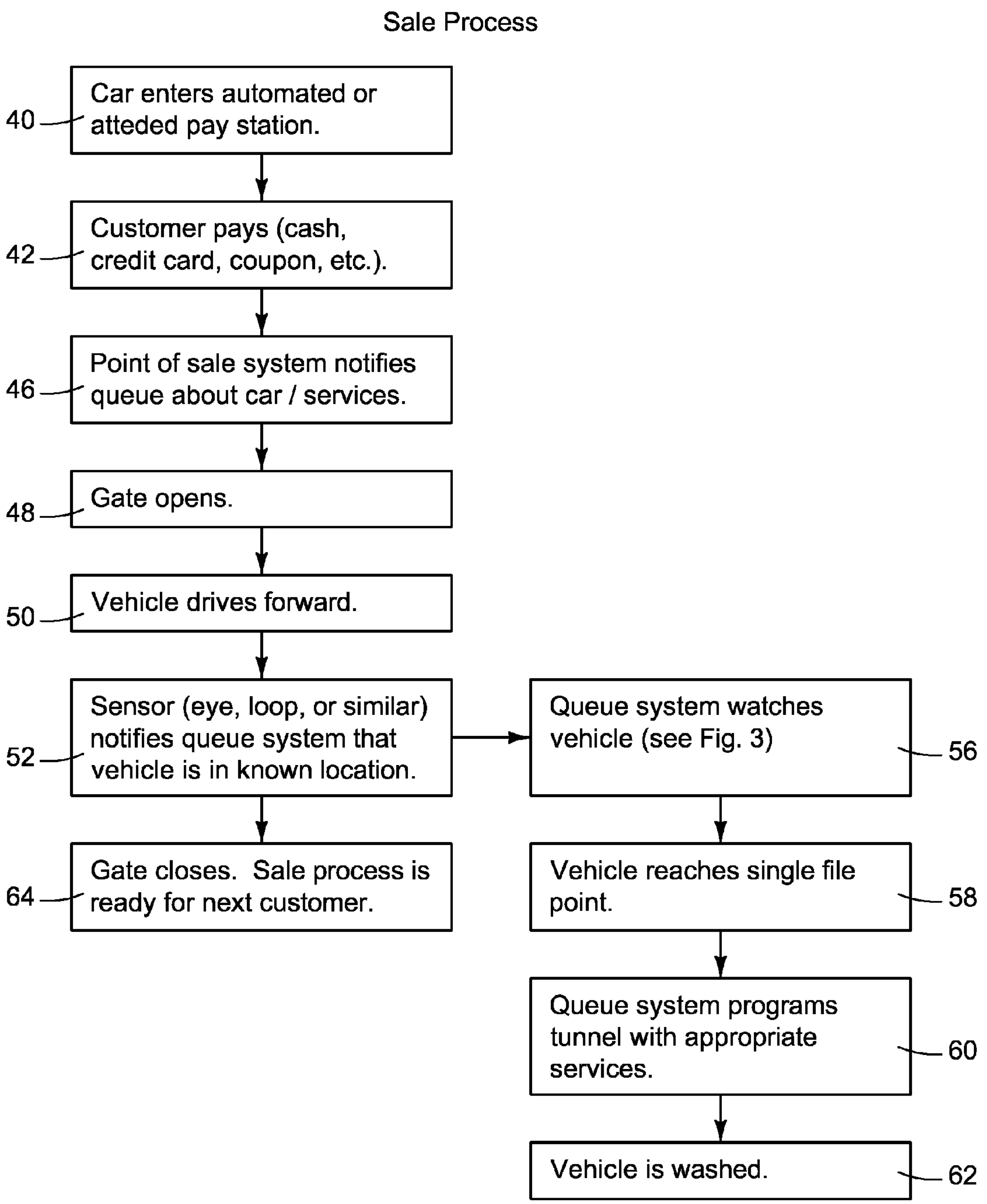
FIG. 2 is a flowchart depicting the steps the vehicle washing system takes to wash a vehicle.

FIG. 2 is associated with the sale process that occurs from the time a vehicle pulls up to the service selection input station until it enters the vehicle washing system tunnel. The service selection input station is a station in which a customer or other person, including an employee of the vehicle washing system, can input a vehicle washing selection or other vehicle service selection and can pay for the selection either at the station or subsequently in the system. The process begins when a vehicle stops at the gate 40 to enter the vehicle washing selection at the service selection input station, selects a vehicle washing selection 42, and pays for the selection 44. The service selection input station can be either an automated station or it can be an attended station monitored and operated by an employee. The payment can consist of cash, check, credit card, coupon, or any other payment means. Subsequently, the service selection input station notifies the queue system of the oncoming vehicle and appropriate vehicle washing selection 46. After the customer chooses a selection and pays for the selection, the gate opens, the vehicle drives forward, and a sensor tracks the vehicle as it travels to the queue point of the system 52. After the vehicle moves into the system, the gate closes behind the vehicle, thus preventing the next vehicle from prematurely entering the system before inputting a service selection and paying for the service selection 64.

After vehicles exit the service selection input station, the vehicles leave the gate and tunnel system and cross a vehicle tracking point 52. The tracking system continues to monitor the vehicles 56 until the vehicles have reached a point where they must be single file. In a preferred embodiment, after the vehicles leave the input selection system the vehicles form a single file line 58 to await a vehicle washing tunnel to become available. Subsequently, a vehicle enters the tunnel and the tracking system displays the vehicle's washing selection to the central control computer of the vehicle washing tunnel 60, 62.

Figure 3:
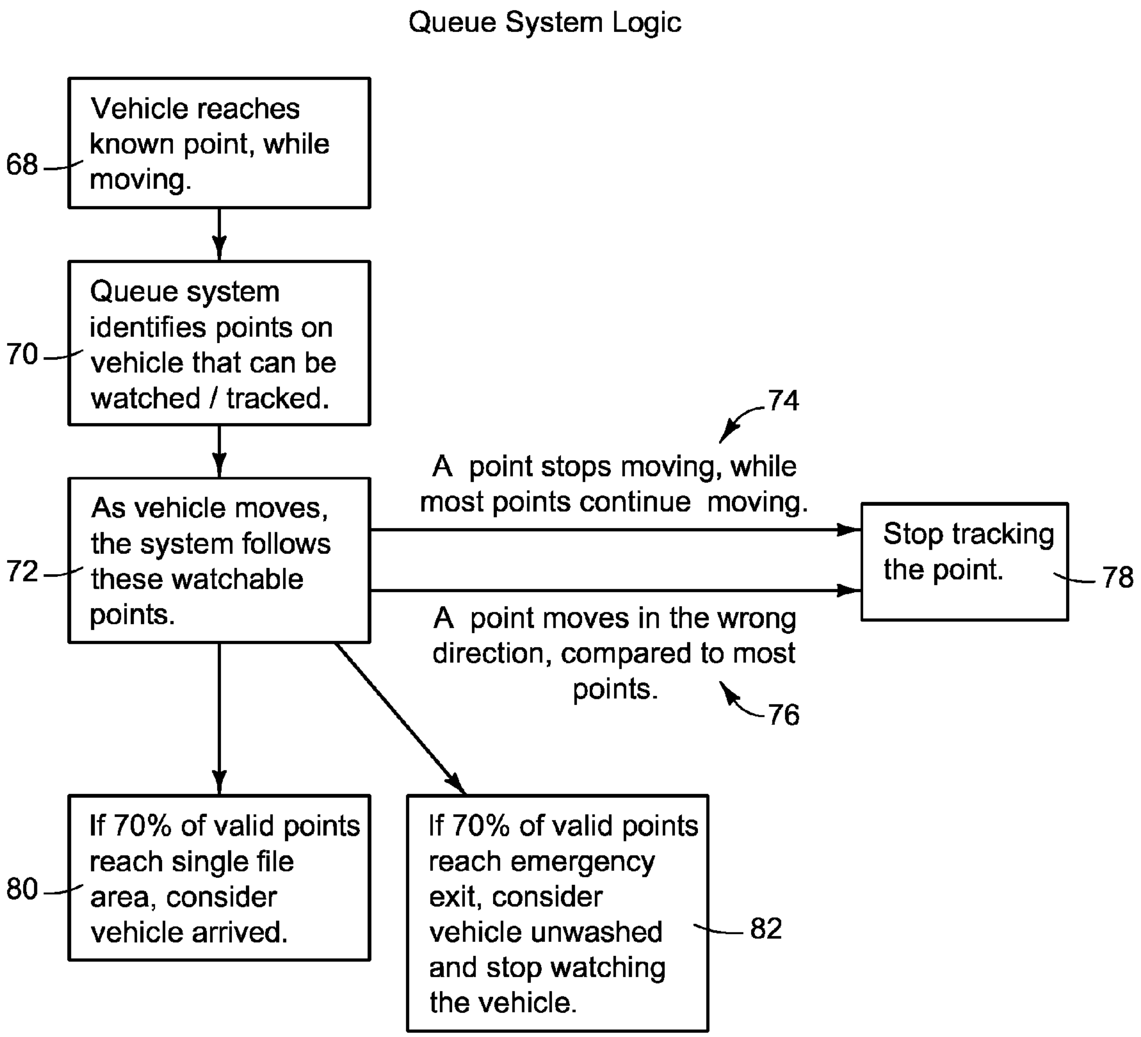
FIG. 3 is a flowchart depicting the steps the Queue system logic takes to track a vehicle.

FIG. 3 displays the basic premise behind the queue system logic in a preferred embodiment. After a vehicle reaches a known point while moving 68, the queue system tracks points on the vehicle that can be watched or tracked 70. As the vehicle moves, the system continues to track the points on the vehicle and generally monitors the vehicle 72. As the tracking system continues to track points, if the system does not track the same points in the event the vehicle has exited the system, the system stops tracking the points and discards the vehicle tracking and vehicle washing selection 82. If the vehicle washing system tracks a number of points associated with a vehicle, the system continues the vehicle tracking and retains vehicle washing selection to provide the correct washing service when the vehicle enters the vehicle washing tunnel. In a preferred embodiment, the vehicle washing system monitors the tracked points and if generally seventy percent or more of the points make it to the vehicle washing tunnel, the system portrays the vehicle washing selection to the central control computer and the vehicle is considered arrived at the wash 80. Although the number seventy percent is generally used, the number can be more than seventy percent or less than seventy percent depending on the system and the selection of the operators. The number 70% is an arbitrarily selected number used in one embodiment of the invention.

In a preferred embodiment, if at least approximately 70% of the tracked points move in one direction, the system tracks the points as being the vehicle. If these points all reach the single file area, the vehicle is considered to have arrived at the washing area 80. If one or more tracked points move in an opposite direction 76 or stop moving 74, the system discards the points. For example, if the system picks up an employee of the vehicle washing system with a small number of points and the employee moves in the opposite direction while the system continues to track the employee, the system tracks that the points are not moving in generally the same direction as the other tracking points and the system discards the points which are tracking the employee or other non-vehicle object.

In a preferred embodiment, any software programs pertaining to the idea behind the system will work; however, I have constructed the system using Borland's Delphi 2007, the OpenCV library for open source code, a wrapper component for the OpenCV library, Vision Labs and Video Labs, and a security camera with a heated weatherproof housing and relatively wide angle lens. Although this is the camera I have used in the preferred embodiment, numerous other types of sensors or vehicle tracking systems can be used. Ideally, the camera lens should be wide enough to see all of the tracking areas below the gates and all of the areas where a vehicle might drive after exiting the entry gate, up to and including the single file zone.

In a preferred embodiment, to record the image, I used a Dazzle DVD Recorder, a USB video capture card, and a Windows XP computer to process the images. The external hardware and software that the system interfaces with that I have used in the preferred embodiment comprise DRB System's Sitewatch point of sales system for controlling the service selection input stations and an Allen Bradley controller which opens and closes our gates and handles all programming of tunnel equipment, including all services a customer might select. Although these are the two programs and external hardware I have used, any program that provides the same services known or developed in the art can also be used.

In a preferred embodiment, the software is written using a clean Delphi form and dropping the following components on to the form and hooking them up. Although these components are what I used, any components known in the art can be used as would be known by someone having ordinary skill in the art. The term VL in the description generally refers to the company VisionLabs, a manufacturer of components. Our components include a TVL DS capture component named DSCapture. This captures the points that the system uses. A second component is a TVL generic filter that gathers information, including the tracking region and the vehicle tracking points, on the image. This is then connected to the DSCapture component. A TVLD display image component named VL main display is hooked to the input pin and to the filter draw tracking component. A TVL snapshot component named VLSnapshot is used to freeze the image when the vehicle reaches the tracking point immediately after it passes the gate. This is connected to the DSCapture component. Finally a TVL find targets component called VLFindTargets is hooked to the input and the output pin of the VLSnapshot component. This software can be written and implemented using a wide variety of software that would be implemented by a person familiar with computer software programming and system implementation.

The image tracking system must be interfaced with the point of sale system that operates the customer vehicle washing selection input station software. The software I used for the interface is DRB System's Sitewatch point of sale system. The system interfaces between the software of the selection input station, the software of the vehicle tracking system, and the software of the vehicle washing system can be wireless interfaces, hard-line interfaces, or any other interface system known. I programmed an array of points for each lane that describes the region where the system should look for a vehicle after it clears the gate. Depending on where the camera is located, this should encompass as much of the vehicle as possible when it clears the gate. Accordingly, the most efficient location to place the camera is mounted high on a pole, wherein twenty feet over the entry lanes being preferred. Ideally, the camera can also view as many lanes as possible at one time to minimize the number of cameras that must be used. I also programmed an array of points for the queue area and for the area before the tunnel wherein vehicles are single file for determining when a vehicle enters into those areas. Additionally, we built an on-process data handler for filter draw tracking and processing the image of the vehicle for vehicle tracking.

Additionally, in a preferred embodiment an array of points for the emergency exit zone can also be written. This is an optional feature that is typically present in the preferred embodiment. The system has an array of points programmed for the emergency exit zone that tracks when a vehicle reaches the exit zone and exits. In an alternative embodiment the system tracks the points on the vehicles and purges the tracking and vehicle washing selection when the vehicle has left the system.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A vehicle tracking and service selection input system configured for interface with a vehicle service system, wherein said vehicle service system has at least one control computer and at least one vehicle servicing tunnel, wherein said vehicle tracking and service selection input system comprises:

a plurality of input stations configured for a inputtee to input a vehicle servicing selection, at least one of said selections comprising a vehicle washing service selection;

a means configured for tracking a vehicle for servicing and associating said vehicle with said inputtee's vehicle servicing selection;

wherein said plurality of input stations have an interface between at least one of said control computers of said vehicle servicing system;

wherein said system is configured such that each of said inputtees inputs a selection into one of said input stations, said vehicle moves and is tracked by said means for tracking a vehicle and associating said inputtee's vehicle servicing selection from said input station to a queue point, wherein said vehicle is queued until at least one of said vehicle servicing tunnels has an available washing tunnel entry point, wherein said vehicle enters said tunnel for servicing; and wherein said vehicle tracking means is configured to convey via said interface when said vehicle reaches a point where said vehicle must enter a certain tunnel said vehicle servicing selection to said vehicle servicing station control computer in order for said vehicle servicing station tunnel to direct said vehicle servicing station to perform said service said inputtee selected.

2. The vehicle tracking and service selection input system of claim one wherein at least one of said vehicle servicing selections comprises at least one vehicle washing selection.

3. The vehicle tracking system of claim 1, wherein said vehicle tracking system further comprises a camera tracking system configured to track said vehicle from said input station, associate said vehicle servicing selection with said vehicle being tracked, track said vehicle from said input station to one of said tunnels of said vehicle servicing system, and deliver said vehicle servicing selection to one of said central computers of said vehicle servicing station generally when said vehicle reaches a point where said vehicle can only enter one tunnel for said vehicle servicing system central computer to direct said vehicle servicing tunnel to perform said vehicle service selection.

4. The vehicle tracking and service selection input system of claim 3, wherein said camera tracking system for tracking a vehicle and associating said tracking with said inputtee's selection further comprises:

a camera, said camera positioned and configured to track a vehicle after said vehicle enters said vehicle tracking and service selection input system;

a processing area interfaced with said camera and said vehicle service selection input station, wherein said processing area is configured to associate said vehicle being tracking with said vehicle servicing selection; and wherein said system is configured such that camera tracks said vehicle, said processing area tracks and associates said vehicle with said inputtee's vehicle servicing selection, and said interface connects said camera, said processing area, and said central computer of said vehicle servicing system such that said central computer of said vehicle servicing system is presented said vehicle servicing selection for said vehicle for appropriate servicing of said vehicle after said vehicle reaches said point where said vehicle is only able to enter one of said tunnels.

5. A vehicle tracking and service selection input system configured for interface with a vehicle washing system, said washing system comprising at least one control computer and at least one vehicle washing tunnel or area, wherein said vehicle tracking and service selection input system comprises:

a plurality of input stations configured for an inputtee to input at least one vehicle servicing selection, at least one of said selections comprising a vehicle washing selection;

a means configured for tracking a vehicle and associating said vehicle with said inputtee's vehicle servicing selection;

wherein said plurality of input stations have an interface between at least one of said control computers of said servicing station;

wherein said system is configured such that each of said inputtees inputs at least one vehicle servicing selection into at least one of said input stations, said vehicle moves from said input station to a queue point, said vehicle is queued until a vehicle washing tunnel is available for the vehicle to enter, wherein said vehicle enters said tunnel for servicing when said vehicle servicing tunnel is available to enter; and wherein said vehicle tracking means is configured to convey via said interface said vehicle servicing selection to said vehicle servicing station control computer in order for said vehicle servicing station control computer to direct said vehicle servicing station to perform said service said inputtee selected after said vehicle reaches a point generally located wherein said vehicle can enter only one tunnel.

6. The vehicle tracking system as in claim 5, wherein said inputtee is a passenger or driver of said vehicle, wherein each of said vehicle tracking systems tracks said vehicle for servicing by tracking at least one of said inputtee's physical traits.

7. The vehicle tracking system of claim 5, wherein said vehicle tracking system tracks a series of points on said vehicle.

8. The vehicle tracking system of claim 5, wherein said means configured for tracking a vehicle and associating said vehicle with said inputtee's vehicle servicing selection further comprises a camera tracking system configured to track said vehicle from said input station to one of said tunnels of said vehicle servicing system, associate said vehicle servicing selection with said vehicle being tracked, and deliver said vehicle washing selection to at least one of said central computers of said vehicle washing station in order for at least one of said vehicle servicing system central computers to direct at least one of said vehicle washing tunnels to perform said vehicle service selection.

9. The vehicle tracking system of claim 8, wherein said camera tracking system further comprises:

a camera, said camera positioned and configured to track a vehicle after said vehicle enters said vehicle tracking and service selection input station system;

a processing area interfaced with said camera, said vehicle service selection input station, wherein said processing area is configured to associate said vehicle being tracked with said vehicle servicing selection; and an interface connecting said processing area with said input stations and at least one of said control computers of said servicing station, wherein said camera is configured to track said vehicle, said processing area is configured to associate said vehicle tracking with said inputtee's vehicle servicing selection, and said interface is configured to connect said camera and processing area with at least one of said vehicle servicing station control computer such that said interface is configured to transfer said vehicle washing selection from said camera and processing area and an identification of one of said plurality of tunnels said vehicle will enter to said control computer of said vehicle servicing system for said vehicle servicing system to perform said vehicle servicing selection.

10. The vehicle tracking system of claim 5 wherein said interface further comprises a wireless interface system.

11. The vehicle tracking system of claim 5 wherein said vehicle tracking system further comprises:

a queue located between said plurality of input stations and said vehicle servicing system, wherein said vehicle tracking and service selection input system is configured such that vehicles from each of said plurality of input stations travels to said queue after inputting said vehicle servicing selection, wherein said vehicles wait for an opening in a vehicle washing tunnel at said queue; and wherein said vehicle tracking system is configured to track each of said vehicles, wherein when one of said vehicle servicing tunnels is available for a vehicle to enter said tracking system displays said vehicle service selection to said control computer for managing said vehicle servicing station.

12. The vehicle tracking system of claim 11, wherein said means configured for tracking a vehicle and associating said vehicle with said inputtee's vehicle servicing selection further comprises a camera tracking system configured to track said vehicle from said input station to one of said tunnels of said vehicle servicing system, associate said vehicle servicing selection with said vehicle being tracked, and deliver said vehicle washing selection to at least one of said central computers of said vehicle washing station in order for at least one of said vehicle servicing system central computers to direct at least one of said vehicle washing tunnels to perform said vehicle service selection.

13. The vehicle tracking system of claim 12, wherein said system is configured to track said vehicle by tracking a plurality of points on said vehicle.

14. A vehicle tracking and service selection input system, wherein said system is configured for application with a vehicle washing service station, wherein said vehicle washing service station comprises at least one control computer configured for controlling vehicle washing equipment of at least one vehicle washing tunnel, wherein a customer selects a vehicle washing service, said vehicle washing selection is delivered to said control computer of said vehicle washing station, said system comprising:

a plurality of input stations, wherein each of said stations is configured for an inputtee to input at least one vehicle washing selection;

a queue located between said plurality of said first stations and said vehicle washing service station, said queue located such that said customer in said vehicle inputs a vehicle washing selection, pays for said vehicle washing selection, and drives said vehicle to said queue wherein a plurality of vehicles travel after inputting selections for vehicle washing into said plurality of input stations; and a vehicle tracking system comprised of a sensor and an interfaced computer positioned and configured to track each of said vehicles, wherein said vehicle tracking system is configured to be operatively interfaced between said plurality of input stations, said queue, and said control computer of said vehicle service station such that said vehicles wait in said queue for a vacancy in said vehicle service station, said vehicle tracking system receives said vehicle washing selection from each of said input stations, said vehicle tracking system transmits said vehicle service selection to said control computer of said vehicle servicing station for performing said vehicle washing service selection when said vehicle travels to a vacancy in said vehicle service station.

15. The vehicle tracking and washing system of claim 14 wherein said vehicle tracking system further comprises at least one sensor located between said queue and said input station for tracking said vehicles from said plurality of input stations to said queue and to said vehicle service station.

16. The vehicle tracking system of claim 14, wherein said vehicle tracking system further comprises a camera tracking system comprising a camera, a processing area, and an output configured to connect to said interface between said input stations and said control computer of said servicing station, wherein said camera is configured to track a series of points on said vehicle, said processing area processes said points and tracks said points to said vehicle washing tunnel and presents said vehicle servicing selection to said control computer of said vehicle servicing station for said control computer to direct said vehicle washing tunnel equipment to perform said selected service.

17. The vehicle tracking and washing system of claim 15, wherein said system further comprises an exit lane between said plurality of input stations and said vehicle washing station for a vehicle to exit said vehicle tracking and washing system, wherein said vehicle tracking and washing system is configured to expunge a vehicle's washing service if said vehicle exits the system.

18. The vehicle tracking system as in claim 16, wherein said vehicle tracking system further comprises:

a camera tracking system comprising a camera;

a processing area;

an output connecting to said interface between said input stations and said control computer of said servicing station;

wherein said camera is configured to track said vehicle, said processing area is configured to process said tracking and associate said tracking with said vehicle washing service selection, wherein said system is configured to present to at least one of said control computers of said vehicle servicing station said vehicle washing service selection generally when said vehicle reaches a point wherein said vehicle can only enter one of said vehicle washing tunnels for said control computer to direct said vehicle washing equipment of said vehicle washing tunnel to perform said vehicle washing service.

* * * * *